United States Patent
Krukowski et al.

(10) Patent No.: US 11,740,695 B2
(45) Date of Patent: Aug. 29, 2023

(54) EYE TRACKING SYSTEM FOR USE IN HEAD-MOUNTED DISPLAY UNITS

(71) Applicant: Inseye LLC, Lincolnshire, IL (US)

(72) Inventors: Piotr Krukowski, Toruń (PL); Michal Meina, Toruń (PL); Piotr Redmerski, Lipno (PL)

(73) Assignee: Inseye Inc., Beacon, NY (US)

( * ) Notice: Subject to any disclaimer, the term of this patent is extended or adjusted under 35 U.S.C. 154(b) by 0 days.

(21) Appl. No.: 17/399,967

(22) Filed: Aug. 11, 2021

(65) Prior Publication Data
US 2022/0050522 A1 Feb. 17, 2022

Related U.S. Application Data

(60) Provisional application No. 63/064,078, filed on Aug. 11, 2020.

(51) Int. Cl.
*G06F 3/01* (2006.01)
*G01B 11/14* (2006.01)
*G01B 11/00* (2006.01)

(52) U.S. Cl.
CPC ............ *G06F 3/013* (2013.01); *G01B 11/002* (2013.01); *G01B 11/14* (2013.01)

(58) Field of Classification Search
CPC .......... G06F 3/013; G06F 3/011; G06F 3/012; G06F 3/0308; G01B 11/002; G01B 11/14;
(Continued)

(56) References Cited

U.S. PATENT DOCUMENTS

| | | | |
|---|---|---|---|
| 10,261,555 B1* | 4/2019 | Cooper | G06F 1/163 |
| 2007/0001833 A1* | 1/2007 | Sharma | H01L 31/02019 340/468 |

(Continued)

OTHER PUBLICATIONS

Rigas, Ioannis et al., Hybrid PS-V Technique: A Novel Sensor Fusion Approach for Fast Mobile Eye-Tracking With Sensor-Shift Aware Correction, IEEE Sensors Journal, Dec. 15, 2017, pp. 8356-8366, vol. 17, No. 24.

(Continued)

*Primary Examiner* — Lunyi Lao
*Assistant Examiner* — Jarurat Suteerawongsa
(74) *Attorney, Agent, or Firm* — Howard & Howard Attorneys PLLC

(57) ABSTRACT

An eye tracking system for use with a head-mounted display (HMD) unit is described. The eye tracking system includes a support frame mounted to the HMD unit, a light source mounted to the support frame and configured to illuminate an area of a patient eye, a plurality of photosensors mounted to the support frame and configured to receive reflected light from different portions of the illuminated patient eye, a temperature sensor mounted to the support frame and configured to measure a temperature of the photosensors, and a processor. The processor is programmed to execute an algorithm including a processing module that compensates photosensor measurement error due to variable operating temperature in the HMD unit, and an eye-tracking module that determines a gaze position of the patient eye using a mapping between intensities of photosensors and a gaze position estimated during a calibration procedure.

18 Claims, 8 Drawing Sheets

(58) Field of Classification Search
CPC ........ G02B 2027/0187; G02B 27/0093; G02B 27/0172; G02B 27/0944; G02B 27/0955; G02B 27/0972; G02B 27/0977; G02B 27/425; G02B 27/4294; G02B 2027/0138; G02B 2027/0178; G06T 19/006
See application file for complete search history.

(56) References Cited

U.S. PATENT DOCUMENTS

| | | | |
|---|---|---|---|
| 2009/0194674 A1* | 8/2009 | Shih | G01J 1/46 250/214 R |
| 2015/0212576 A1* | 7/2015 | Ambrus | G06F 3/0482 345/156 |
| 2017/0283760 A1* | 10/2017 | Peng | C12M 41/42 |
| 2019/0261849 A1* | 8/2019 | Hakoshima | A61B 3/14 |
| 2019/0361523 A1* | 11/2019 | Sharma | G02B 27/0972 |
| 2020/0110271 A1 | 4/2020 | Komogortsev et al. | |
| 2020/0355929 A1* | 11/2020 | Zhang | G02B 27/0179 |

OTHER PUBLICATIONS

Rigas, Ioannis et al., Photosensor Oculography: Survey and Parametric Analysis of Designs Using Model-Based Simulation, IEEE Transactions of Human-Machine Systems, manuscript received May 28, 2017 and accepted Feb. 11, 2018, 12 pages.

Li, Tianxing et al., Ultra-Low Power Gaze Tracking for Virtual Reality, SenSys'17, Nov. 6-8, 2017, Delft, The Netherlands, 14 pages.

Katrychuk, Dmytro et al., Power-efficient and shift-robust eye-tracking sensor for portable VR headsets, ETRA 19, Jun. 25-28, 2019, Denver, CO, USA, 8 pages.

Griffith, Henry et al., Assessment of Shift-Invariant CNN Gaze Mappings for PS-OG Eye Movement Sensors, ICCV Workshop paper, provided by Computer Vision Foundation, 9 pages.

* cited by examiner

EYE TRACKING SYSTEM FOR USE IN HEAD-MOUNTED DISPLAY UNITS

CROSS-REFERENCE TO RELATED APPLICATION

This application claims the benefit of U.S. Provisional Patent Application Ser. No. 63/064,078, filed Aug. 11, 2020, the disclosure of which is hereby incorporated by reference in its entirety.

TECHNICAL FIELD

The present invention relates to head-mounted display (HMD) units and, more specifically to a low-power eye tracking system for use in head-mounted display units.

BACKGROUND OF THE INVENTION

Nowadays, the most popular eye tracking products are based on IR cameras configured to record eye images. This data stream is used to determine the position of the pupil, which is then the basis for calculating the gaze vector. This approach offers high tracking accuracy and robustness against factors such as the shift of the headset. However, this solution is burdened with problems such as: 1) Complicated assembling, often using IR mirrors directing IR light reflected from the eyes onto the camera lens; 2) IR cameras are relatively expensive; 3) Total weight of the eye tracking module significantly affects the HMD wearing comfort; 4) Heat emission may require an additional cooling system; 5) High energy demand; and 6) Computing power consuming dedicated for image processing.

In the case of stationary devices connected to a PC, such problems may not be big barriers as in the case of mobile, standalone TIMID devices. HMD mobile device assumes full independence from external resources. Therefore, any saving in the indicated parameters translates into significant value.

The present invention is aimed at one or more of the problems identified above.

SUMMARY OF INVENTION

In one aspect of the present invention, an eye tracking system for use with a head-mounted display (HMD) unit is provided. The eye tracking system includes a support frame mounted to the HMD unit, a light source mounted to the support frame and configured to illuminate an area of a subject's eye, a plurality of photosensors mounted to the support frame and configured to receive reflected light from different portions of the illuminated eye, a temperature sensor mounted to the support frame and configured to measure a temperature of the photosensors, and a processor. The processor is programmed to execute an algorithm including a processing module that compensates photosensor measurement error due to variable operating temperature in the HMD unit, and an eye-tracking module that determines a gaze position of the eye using a mapping between intensities of photosensors and a gaze position estimated during a calibration procedure.

In another aspect of the present invention, a method of operating an eye tracking system mounted to an HMD unit is provided. The eye tracking system includes a light source configured to illuminate an area of a subject's eye, a plurality of photosensors configured to receive reflected light from different portions of the illuminated eye, a temperature sensor configured to measure a temperature of the photosensors, and a processor. The method includes the processor performing an algorithm including a processing module that compensates photosensor measurement error due to variable operating temperature in the HMD unit, and an eye-tracking module that determines a gaze position of the eye using a mapping between intensities of photosensors and a gaze position estimated during a calibration procedure.

In yet another embodiment of the present invention, a non-transitory computer-readable storage media having computer-executable instructions embodied thereon for operating an eye tracking system mounted to an HMD unit is provided. The eye tracking system includes a light source configured to illuminate an area of a subject's eye, a plurality of photosensors configured to receive reflected light from different portions of the illuminated eye, a temperature sensor configured to measure a temperature of the photosensors, and a processor. When executed by the processor, the computer-executable instructions cause the processor to perform an algorithm including a processing module that compensates photosensor measurement error due to variable operating temperature in the HMD unit, and an eye-tracking module that determines a gaze position of the eye using a mapping between intensities of photosensors and a gaze position estimated during a calibration procedure.

BRIEF DESCRIPTION OF DRAWINGS

Non-limiting and non-exhaustive embodiments of the present invention are described with reference to the following figures. Other advantages of the present disclosure will be readily appreciated, as the same becomes better understood by reference to the following detailed description when considered in connection with the accompanying drawings wherein.

Corresponding reference characters indicate corresponding components throughout the several views of the drawings.

DETAILED DESCRIPTION OF THE INVENTION

Figure 1:
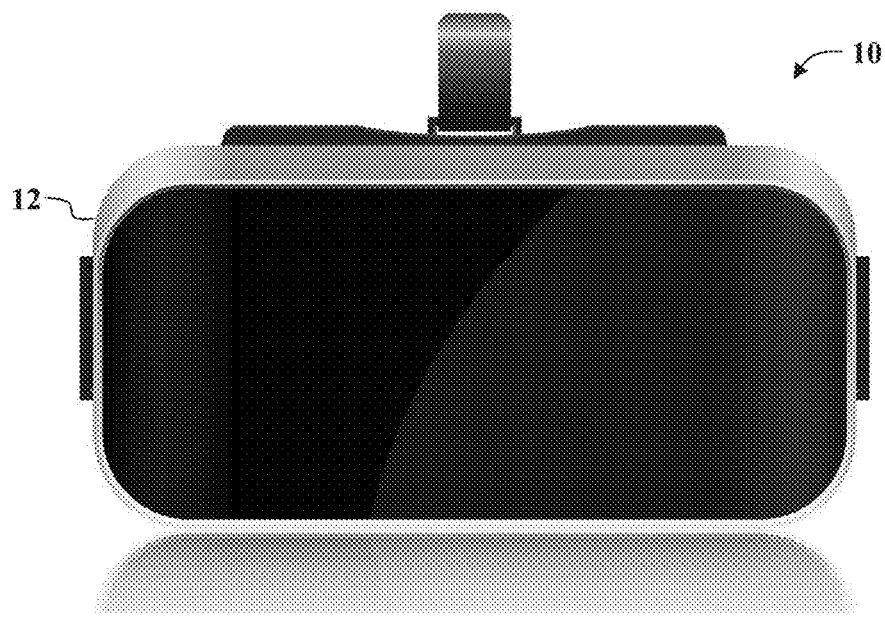
FIGS. 1 and 2 are schematic diagrams of a head mounted display unit including an eye tracking system, according to embodiments of the present invention.
Figure 2:
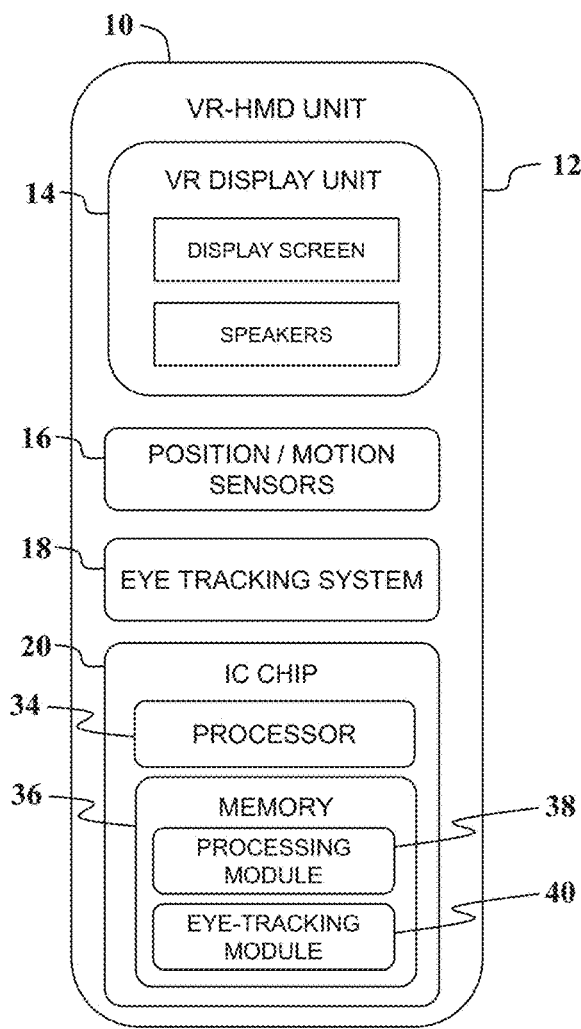
Figure 3:
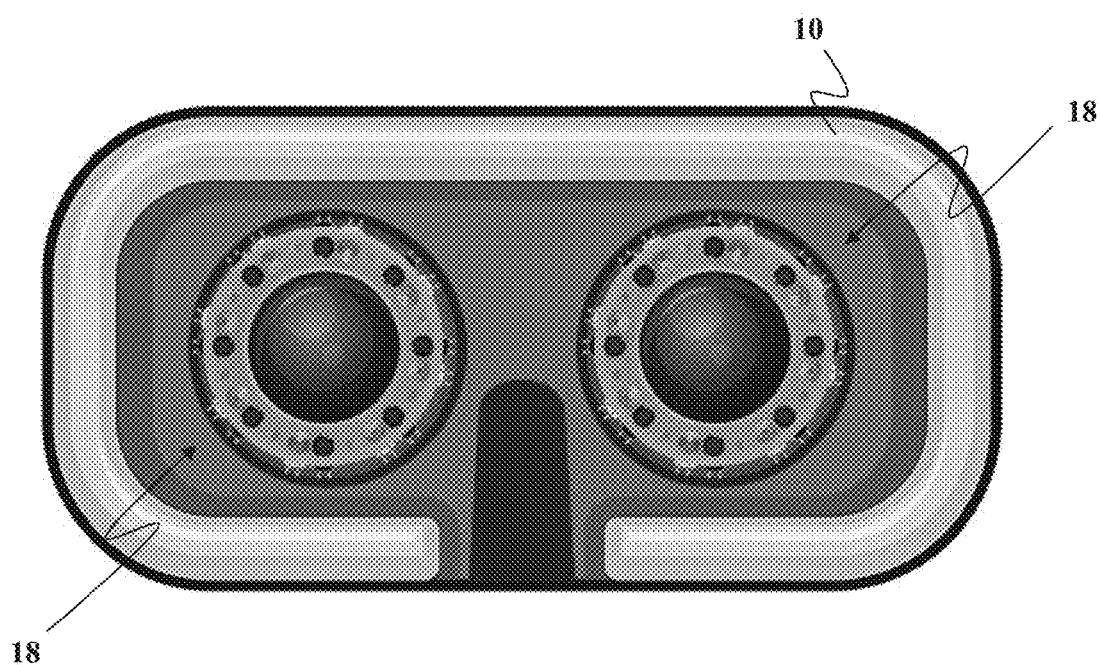
FIGS. 3 and 4 are partial perspective views of the head-mounted display unit including the eye tracking system shown in FIGS. 1-2.

With reference to the drawings and in operation, the embodiments of the present invention provide a head-mounted display (HMD) unit and an eye tracking system for use with HMD units. The eye tracking system includes a number of photosensors and light emitters (e.g., NIR) placed at specific points, e.g., around a lens or see-through display placed in HMD (one eye tracking set per one eye). The light source illuminates the area of the eye in a variable mode, turning on and off specific diodes alternately, creating repetitive lighting patterns generated at high time frequency. This method improves data quality. Photosensors detect the intensity of light (e.g., NIR) reflected from the eye surface. Changing the eye alignment influence a change of light intensities registered on photosensors configured to monitor selected eye regions. Based on this rule, system calculates gaze direction. Variable temperature in HMD's interior can affect the photosensors readings, therefore additional techniques for temperature compensation based on temperature measurements are applied. Moreover, as this technique itself is not resistant against the shift of HMD in relation to head, the proposed system may be also combined with an additional optical sensor configured to monitor relative position between the headset and user's face. For this purpose, eye tracking system may use also data collected by accelerometer or gyroscope modules built-in HMD. This input is then used to compensate occurred shifts or force re-calibration procedure. The sensor can be placed in the fabric that touches the user's skin. The sensor can operate without contact with the skin, placed approximately 1-3 mm away. The combination of photosensor temperature drift compensation and head-movement detection techniques creates a novelty in eye tracking industry.

Variability of the temperature in the interior of HMD causes the lagged temperature changes of photosensor. Specifically, shortly after mounting the HMD, the interior temperature can raise gradually and non-linearly from the room temperature to up to 20° C. above the initial temperature. On the other hand, dismounting the HMD effects in rapid temperature drop. The final temperature is affected by the skin temperature, heat emitted by the electronics and lack of the air circulation. Taking into account the operation theory of photosensor, it is well known that the sensor temperature affects non-linearly measurement of light intensity. Compensation model arises directly from the photosensors theory of operation and relies only on photosensor temperature measurement. Moreover, in the compensation procedure a heat transfer between photosensor and HMD interior need to be taken into account by heat transfer equations. In most simplest form the heat transfer can be expressed accurately enough with usage of just one coefficient, that need to be estimate for concrete incarnation of the HMD.

The flagship application for the eye tracking module built-in mobile HMD is a technique called foveated rendering. This term means the ability of the system to focus its own resources on high quality rendering of the virtual environment in accordance to the gaze direction. Simultaneously, the virtual projection quality is reduced for peripheral areas beyond the focus area (e.g., lower resolution visible peripherally visible as blurred image). What is important here is the balance between the resources allocated to the eye tracking and the savings associated with peripheral image degradation. This solution saves a significant amount of available resources in this context and can significantly improve the user experience (by for example higher frame-rate or more detailed rendering using the same hardware).

Photosensor-based eye-tracking can also be used to estimate inter-pupilar distance (IPD) in non-direct manner. IPD is crucial measurement that need to be performed to ensure proper rendering of stereoscopic images on HMD (either by physically changing the lenses position or by changing the rendering pipeline configuration). Therefore, one of the main applications of the eye-trackers is to measure directly IPD or to estimate it indirectly. In this embodiment of eye-tracking the set of stereoscopic images, in which the different values of IPD is assumed is shown to the user. Analysis of the eye movement (e.g., microsacade count or occurrence movement connected to cyclovergence) is treated as a fit to proper IPD.

Calibration procedure is a necessary step that aims to find a relation between light intensity changes and eye movements. In the simplest embodiment calibration step consist of presenting on HMD at least three points with instructions to fixate on those. Recorded data are used to calculate relation between photosensors readings and eye gaze location. This relation can be expressed in one of the form: 1) set of mathematical equations, or 2) internal machine learning algorithm data.

Eye tracking of presented kind is an excellent tool for applications where moderate tracking accuracy (~1 degree) is good enough to achieve the content and/or business objectives. Nevertheless, the majority of applications related to the mass market of B2C and B2B do not require more precision.

One example is the analysis of the user's attention in relation to the elements embedded in the virtual environment of an advertising or marketing nature (e.g., advertising banners placed inside the game). Another example related to this field may be the analysis of attention in virtual store interiors available as 3D space imitating a real shopping experience.

Moreover, the proposed solution will significantly simplify the user interface navigation designed for 3D environments. Selecting action buttons or other objects with the use of eyesight allows to reduce the number of unnecessary actions such as clicks on a handheld controller. In this case, active objects such as buttons, links, images, etc. may support the virtual cursor snap that is controlled by gaze direction. An important improvement is also the implementation of simple gestures controlled by a specific eye movement or blink. The system can detect gestures such as: look left, look right, look down, look up, blink once, blink twice, blink only one eye. These types of gestures are extremely useful in immersive content that supports this type of navigation (e.g., scrolling, rotating an object, closing a window, undo, redo). This example brings a huge improvement in usability and user experience.

An interesting implementation of presented eye tracking is improved human communication done through virtual environments generated in HMDs. Virtual meetings of avatars can be enhanced by transferring real eye movements into rendered avatar's eyes. In this way, social interactions will become more natural, better reflecting the reality.

It is also worth to highlight one of the most popular VR/AR/MR content groups: games and entertainment apps. An additional method of interaction based on the gaze direction means a great enhancement for game scenarios and mechanics. Game designers will be able to develop games that use gaze direction to control, aim, catch, mark and execute many other useful actions.

Referring to FIGS. 1-11, in the illustrated embodiment, the present invention includes a virtual reality head mounted display (VR-HMD) unit 10. The VR-HMD unit 10 includes a plurality of components contained with a housing 12. The components include, but are not limited to, a VR display unit 14, a sensor group 16, an eye tracking system 18, and a controller 20. The VR display unit 14 includes a VR display screen and one or more integrated speakers for rendering a virtual reality scene. The sensor group 16 includes one or more position/motion sensors for sensing a movement and/or orientation of the VR-HMD unit 10. The position/motion sensors may include, but are not limited to, accelerometer sensors, gyro sensors, and/or proximity sensors configured to sense movement, orientation, and/or direction of the VR-HMD unit 10.

The controller 20 includes an integrated circuit (IC) chip that is coupled to the VR display unit 14, sensor group 16, and eye tracking system 18. The IC chip includes a processor that is programmed to operate the eye tracking system 18, sensor group 16, and VR display unit 14 to display the virtual reality scene based on information received from the sensor group 16 and eye tracking system 18. The controller 20 may include a SoC chip built into the VR-HMD unit 10 for rendering a VR scene using the VR display screen.

The VR-HMD unit 10 may also include a communications device for use in communicating between the VR display unit 14 and an external computing device such as, for example, a hand-held control device, server computer, and/or a user computing device. The user computing devices may include, but is not limited to, a desktop computer, a laptop or notebook computer, a tablet computer, smartphone/tablet computer hybrid, a personal data assistant, a handheld mobile device including a smartphone, and the like. The communications device may include a Wi-Fi antenna, a cellular network antenna, a Bluetooth™ communications device, a wired communications port, and/or any suitable wired and/or wireless communications device to facilitate communications with the hand-held control device, server computer, and/or user computing devices.

VR-HMD unit 10 may support 5G wireless network which could enable to using external computing power support that will execute computer power demanding tasks outside the HMD.

The eye tracking system 18 includes one or more eye tracking assemblies 22 that include a support frame 24, one or more light emitters 26 mounted to the support frame 24, one or more photosensors 28 mounted to the support frame 24, and one or more temperature sensors 30 (e.g., thermistors) mounted to the support frame 24. Each photosensor 28 is positioned with respect to a corresponding light emitter 26. The light emitter 26 may include, for example, an IR emitter and/or an incandescent light source. The photosensor 28 may include, for example, a narrow-angle photosensor and/or photodiode. In some embodiments, the eye tracking system 18 includes a pair of eye tracking assemblies 22 with each eye tracking assembly 22 being associated with a corresponding eye of the patient.

In the illustrated embodiment, the thermistor 30 is coupled to the controller 20 and is configured to measure the temperature of the interior of the VR-HMD 10. The temperature in the interior of the HMD 10 is variable during the usage of HMD (e.g., the interior temperature may rise even by 10-15° C. within minutes when the HMD is mounted by the user, or the interior temperature may drop very fast to the exterior ambient temperature during dismounting the HMD from the user's head). It is well-known from the theory of operation of the photosensors that its temperature affects the reading, and the temperature of interior of HDM affects greatly the temperature of photosensors. This phenomenon introduces a specific error in photosensor reading (the drift error, that rises the reading non-linear over time). By including the thermistor 30 to sense the interior temperature of the VR-HMD 10 and incorporating the sensed temperature reading into the photosensor-based eye tracking system 18, the eye tracking system 18 significantly reduces the error of estimating the gaze position.

In the illustrated embodiment, the eye tracking system 18 is configured to implement Photosensor Oculography (PSOG) which includes an eye-tracking technique based on the principle of using simple photosensors to measure the amount of reflected light when the eye rotates. PSOG can provide measurements with sufficient precision, low latency, and reduced power consumption, and thus it appears as an attractive option for performing eye-tracking in the emerging head-mounted interaction devices, e.g., augmented and virtual reality (AR/VR) headsets.

Figure 8:
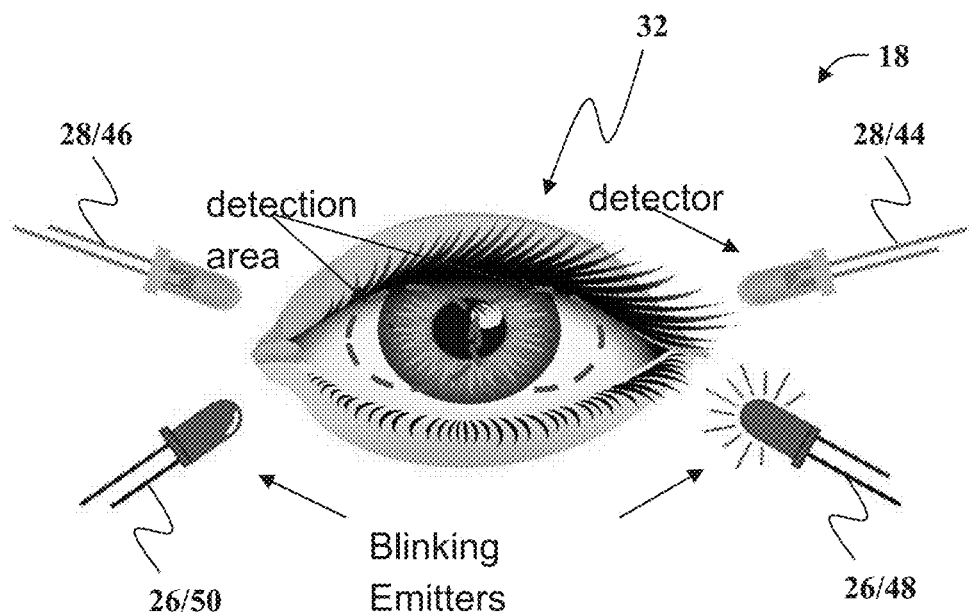
FIGS. 8-10 illustrate various operational modes of the system shown in FIGS. 1-2.

For example, as shown in FIG. 8 the eye tracking system 18 includes incandescent light source (emitters) that illuminate the eye and a narrow-angle photosensor detects the intensity of reflected light in a specified and precisely chosen area. In some embodiments, predefined subsets of the emitters alternately illuminate the eye forming (Illumination setup A and Illumination setup B). Illumination Setups differ by angle of illumination and/or wavelength of light (800 nm-900 nm).

The eye tracking system 18 is composed of a plurality of light sources, and a plurality of photosensors (PS). Data from PS are acquired using ADC (analog-to-digital) converters with additional operational amplifiers. The embedded microprocessor (EM) is responsible for communication with ADC's and turning switching illumination setup. EM also calculates the eye position using a set of polynomial equations that map the PS readings into eye position. Coefficients of equations are determined by the calibration procedure. The eye tracking system 18 is integrated with a head-mounted display and eye-tracking is limited to register gaze trajectory over the display.

Figure 6:
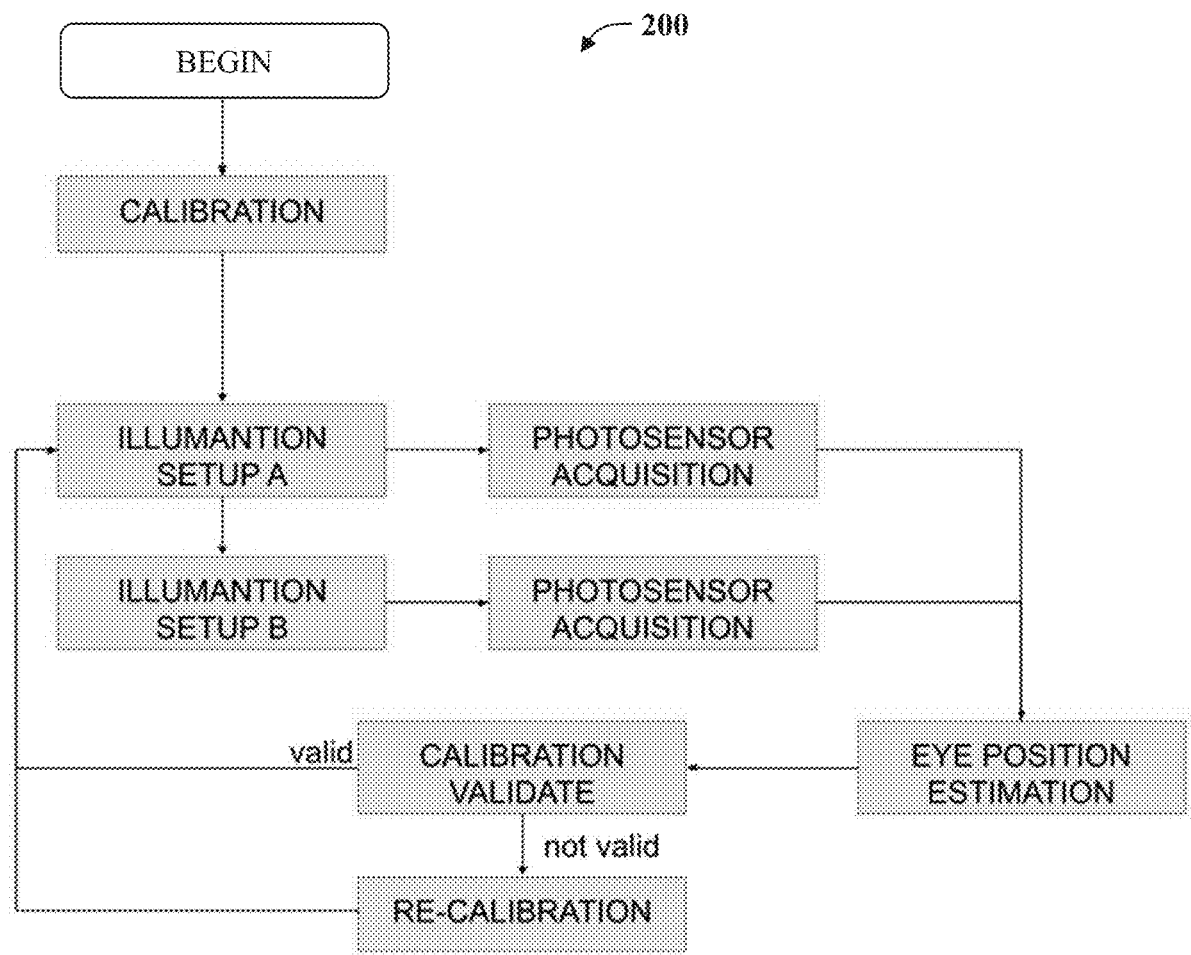
FIGS. 6 and 7 are flowcharts illustrating algorithms that may be executed by the system shown in FIGS. 1-2.

FIG. 6 illustrates an operational diagram illustrating algorithms executed by the controller 20 to operate the eye tracking system 18. In the illustrated embodiment, the calibration procedure (determining the coefficient of the set of polynomial equations) is performed at system initialization. Equally distributed grid of points (between 5 to 15 points are used) is presented as a calibration target. During operation, illumination is switched between setup A and B, while the PS's are acquiring intensity at predefined areas. Eye position estimation is performed at EM. The additional calibration validation procedure is performed in the next step, indicating if additional recalibration is needed.

Re-calibration is needed if the shift between headmounted display and the eye will occur. Such a situation can be detected by one of the methods: 1) User input, 2) Rapid movement detection using accelerometer sensors; 3) Additional optical-based sensor detect movement between the head mounted display and the skin; 4) The head-mounted display application indicates a problem; and 5) center of fixational probability map shift.

Re-calibration is a simplified process of calibration that modifies the calibration data using to account for the head-headset shift using one of the means: 1) presenting simplified calibration pattern, 2) using the rough or exact headset-head displacement vector, 3) using VR application data (e.g., known locations of application stimulus).

Figure 9:
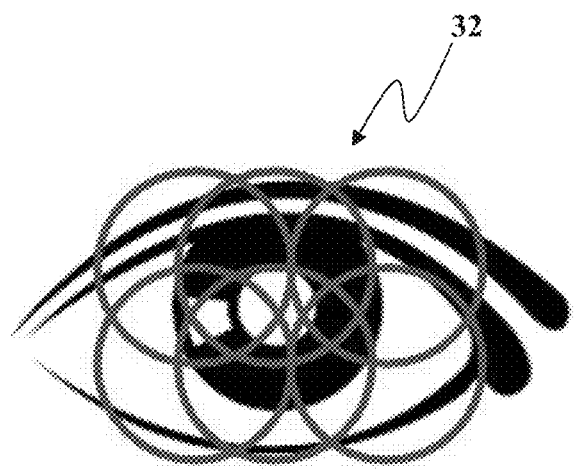

FIG. 9 illustrates one possible detection area arrangement of 6 photosensors. The detection area overlaps by 40% of neighboring area.

The present invention improves existing eye tracking technologies by including: 1) Low-cost BOM and easy mounting; 2) Computing power efficiency; 3) Energy efficiency; 4) Heat emission; and 5) Total weight The present invention is far more superior in comparison to any kind of market available products, and achieve accuracy ~1°. In comparison to existing PSOG (photosensor oculography) solutions provided by the present invention implement a few novel features/approaches, including: 1) Shift problem—PSOG is very sensitive to displacements of the headset position in relation to the head. Additional optoelectronic sensor that is capable of detecting movements between the HMD and the skin may be implemented (technical solutions can be adopted from optical mouse that is able to calculate movement on various surfaces using special purpose image-processing chips). The optoelectronic sensor can be mounted in foam that ensures head set to skin adjacency; 2) To increase data volume and tracking quality, the system may use sequential switching of IR emitters (possibly using different wavelength which influences amount of light reflected from pupil) that illuminates the eye area in variable lighting patterns (instead of all emitters constantly active); 3) re-calibration procedure that simplifies the process of recovering the eye tracking module after detection of headset-head shift; and 4) temperature compensation, that minimizes the drift error in intensity measurements on individual photosensors (since this phenomenon is easily misinterpreted as head-shift error in photosensor-based eye-tracking devices, in our case it significantly improves the tracking accuracy).

The eye tracking system described herein is AR, MR and VR ready.

Figure 11:
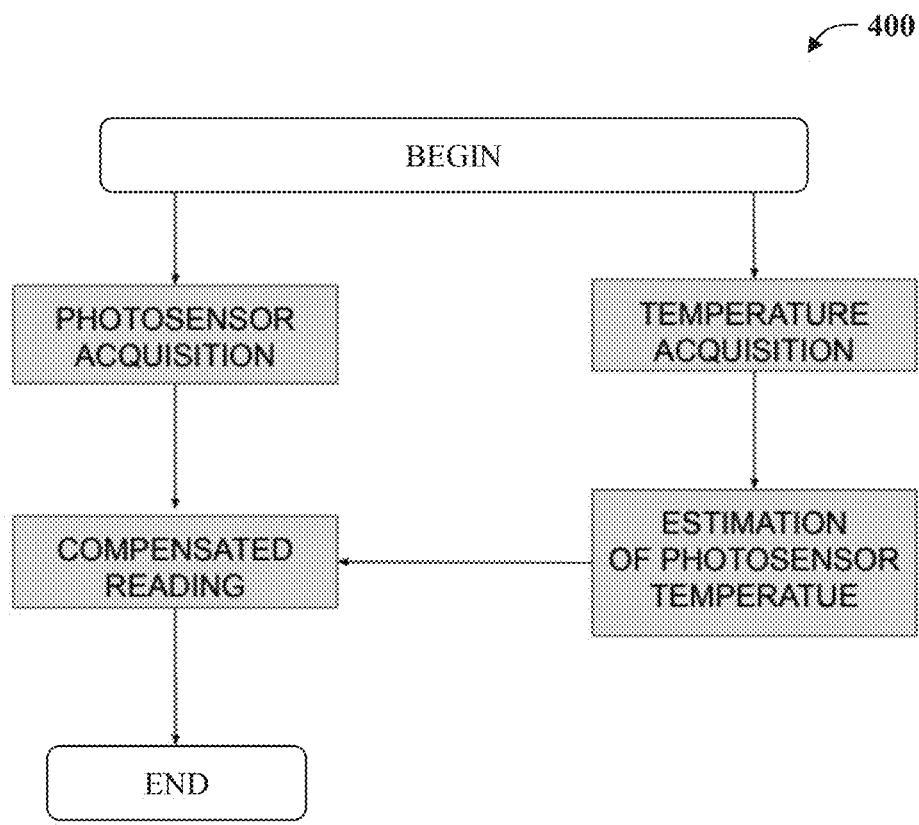
FIG. 11 is a flowchart illustrating algorithms that may be executed by the system shown in FIGS. 1-2.

FIG. 11 is a flowchart illustrating algorithms that may be executed by the controller 20 for operating the eye tracking system 18 to include temperature compensation for the photosensor readings. For illumination measurement using a single photosensor, following procedure is exploited (as shown in FIG. 11). In the illustrated embodiment, photosensor and temperature reading is performed by the controller 20. The temperature measurement is used to estimate exact temperature of photosensor, using following heat transfer equation:

$$T_{ph}(i) = T_{ph}(i-i) + K \cdot (T(i-1) - T(i)) \qquad \text{Equation 1:}$$

Where: T(i) and Tph(i) is the i-th measured interior temperature and photosensor temperature, at the i-th time respectively; and K is heat transfer coefficient, estimated using separate calibration procedure for specific setup of HMD 10. This heat transfer formula is used because, temperature capacity of the thermistor 30 and photosensors 28 in most cases are significantly different.

Next, a photosensor reading is compensated using following formula, derived from modelling a photosensor as controlled current source connected in parallel to an exponential diode:

$$I_{compensated} = \frac{I_{measrumeed}}{e^{T_{ph}} \cdot \alpha} \qquad \text{Equation 2}$$

Where: Icompensated and Imeasured are illumination readings compensated and measured respectively.

Figure 10:
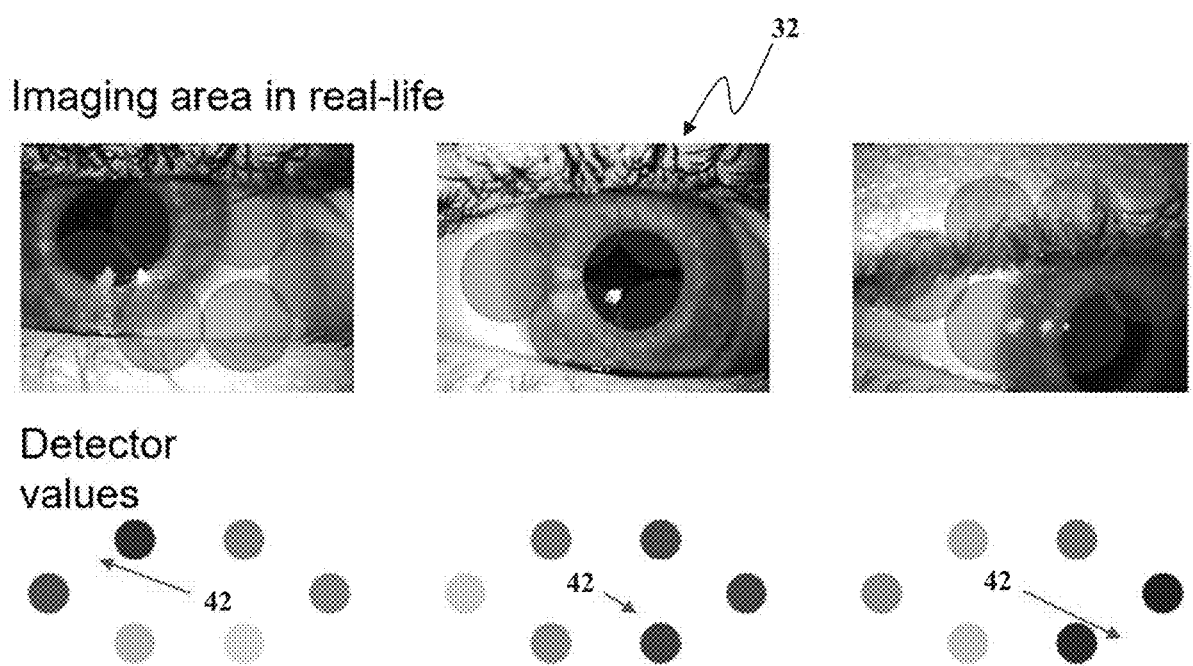

In some embodiments, the eye tracking system 18 is used with the HMD 10. The eye tracking system 18 includes a light source 26 that is configured to illuminate an area of a patient's eye 32 of a patient, a plurality of photosensors 28 that are configured to receive reflection from different (possibly overlapping) parts of the illuminated eye 32 (as shown in FIGS. 9 and 10), and one or more temperature sensors 30 (e.g., thermistors) configured to measure a temperature of photosensors 28 and/or an interior temperature of the HMD 10. The eye tracking system 18 may also include the controller 20 having a processor 34 and memory device 36 coupled to the processor 34. The memory device 36 is a non-transitory computer-readable storage media having computer-executable instructions embodied thereon. The memory device 36 may include a processing module 38 and an eye tracking module 40. The processing module 38 includes computer-executable instructions that, when executed by the processor 34, cause the processor 34 to perform an algorithm including the step of compensating photosensors measurement error due to variable operating temperature in the HMD unit 10. The eye tracking module 40 includes computer-executable instructions that, when executed by the processor 34, cause the processor 34 to perform an algorithm including the step of determining the gaze position using a mapping between intensities 42 of photosensors 28 (shown in FIG. 10) and gaze position estimated during a calibration procedure. When performing mapping between intensities of photosensors 28 and gaze position estimated during a calibration procedure, the processor 34 may implement any suitable method that maps input vector of light intensities into 2-dimensional position of gaze that includes a machine learning (e.g., neural network, classification etc.) or simple interpolation of input values and 'closest value finding' or using a set of polynomial equations which coefficient are determined during the calibration procedure (as described above).

The processor 34 is further programmed to execute the algorithm steps including using the gaze estimation to adjust the display properties in HMD 10, adjust the rendering process for the HMD 10, perform an interaction with the user, and/or perform the IPD measurements basing on gaze properties.

The processor 34 may be further programmed to execute the algorithm steps including using the interior temperature measurement from the temperature sensor 30 to compensate the error of photosensor reading. For example, the processor 34 may use a heat transfer formula between interior of HMD 10 and photosensor 28 to estimate the temperature of photosensor, wherein coefficient of heat transfer formula is determined for specific incarnation of the HMD. The processing module 38 then causes the processor 34 to compensate a non-linear independence of photosensor reading with its temperature.

The processor 34 is further programmed to compensate the reading of photosensors for error connected with temperature variation in the HMD 10. The calibration data is acquired for the user by the processor 34 in which the fixation target is presented on the HMD 10 sequentially at multiple known locations and the light intensities gathered by photosensors are stored. The calibration data is used to construct a mapping between intensities values and gaze position in one of the following way: 1) calibration data is used to construct a mapping basing purely on reading of single user, or 2) general mapping is modified for selected user.

Figure 7:
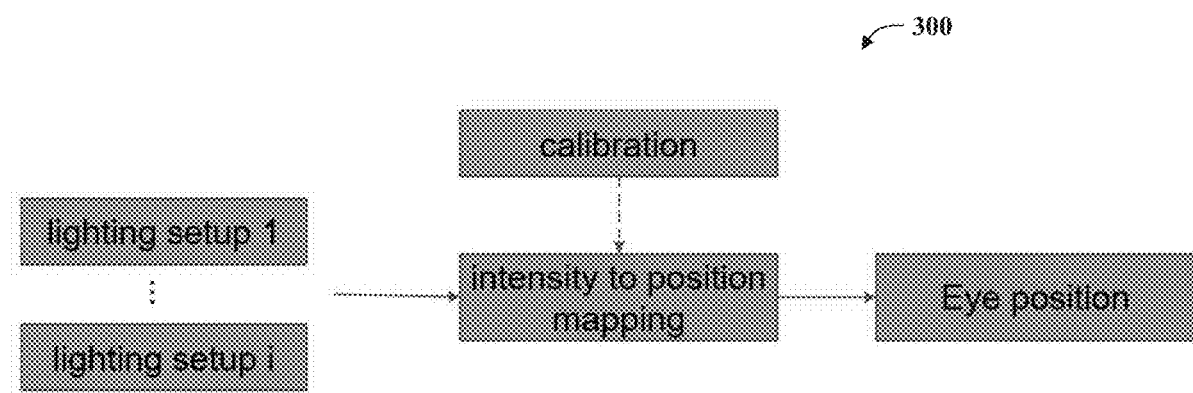

FIGS. 6, 7, and 11 are flow charts of methods 200, 300, and 400 illustrating the algorithms included in the memory device 36 and performed by the processor 34 when operating the HMD unit 10 and eye tracking system 18. The methods include a plurality of steps. Each method step may be performed independently of, or in combination with, other method steps. Portions of the methods may be performed by any one of, or any combination of, the components of the HMD unit 10.

Figure 4:
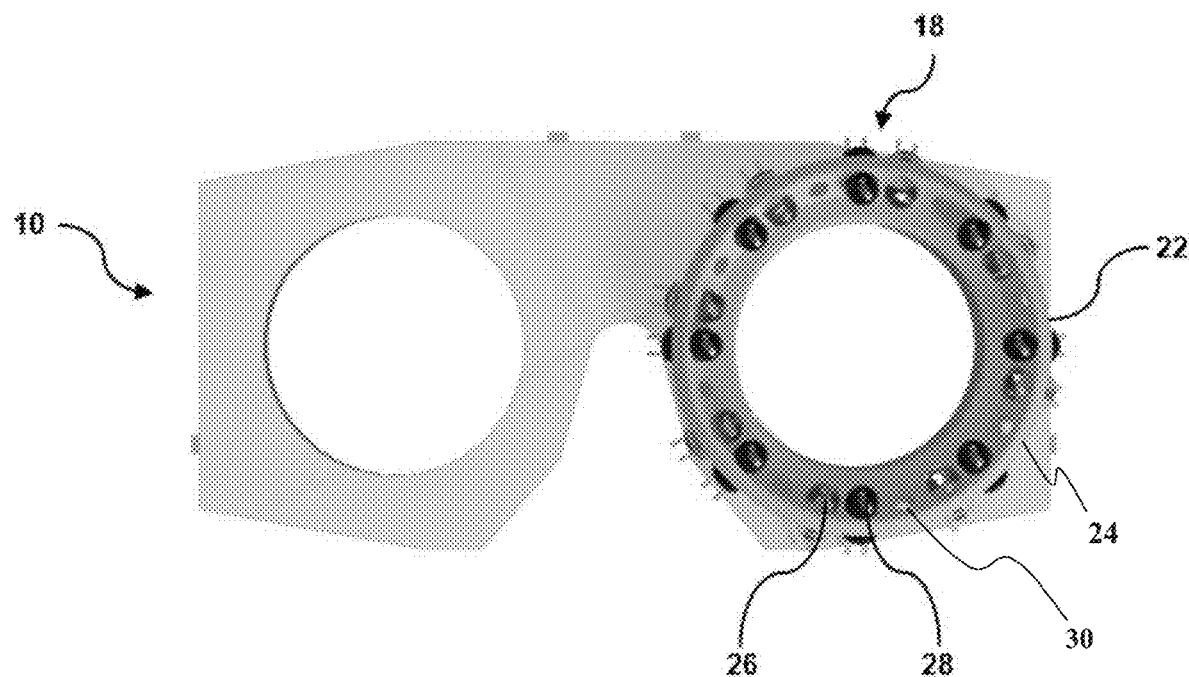
Figure 5A:
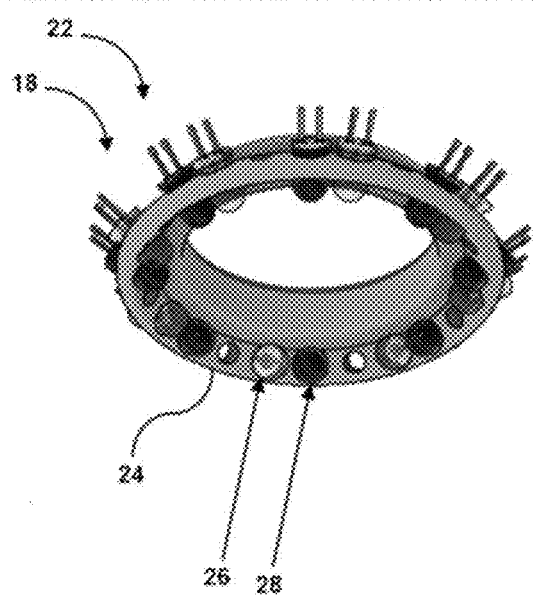
FIGS. 5A-5C are perspective views of the eye tracking system shown in FIGS. 3-4.
Figure 5B:
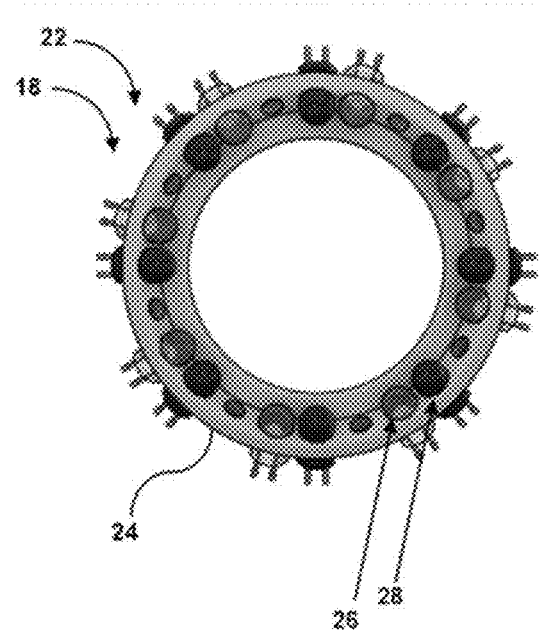
Figure 5C:
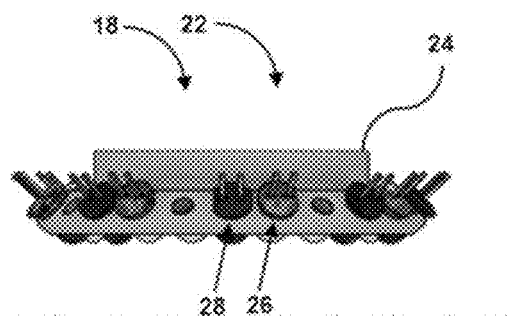

In the illustrated embodiment, the eye tracking system 18 includes the support frame 24 mounted to a housing of the HMD unit 10. A light source 26 is mounted to the support frame 24 and is configured to illuminate an area of a patient eye 32. The light source 26 may include a plurality of light emitters orientated about a perimeter of the patient's eye 32 (as shown in FIG. 4). A plurality of photosensors 28 are mounted to the support frame 24 and configured to receive reflected light from different portions of the illuminated patient eye 32. The plurality of photosensors 28 may be orientated about a perimeter of the patient's eye 32 (as shown in FIG. 4). One or more temperature sensors 30 are mounted to the support frame 24 and configured to measure a temperature of the photosensors 28. In some embodiments, a temperature sensor 30 may be positioned adjacent each corresponding photosensor 28. In other embodiments, a single temperature sensor 30 may be mounted to the support frame 24 and configured to sense an interior temperature of the HMD unit 10.

In the illustrated embodiment, the eye tracking system 18 includes a processor 34 that is programmed to execute the algorithms shown in methods 200, 300, and 400. For example, the processor 34 may be programmed to execute an algorithm including a processing module that compensates photosensor measurement error due to variable operating temperature in the HMD unit using method 400, and an eye-tracking module that determines a gaze position of the patient eye including a mapping between intensities of photosensors and a gaze position estimated during a calibration procedure using methods 200 and/or 300.

In some embodiments, the processor 34 is programmed to execute the algorithm including the steps of determining the gaze position of the patient eye 32 using the mapping between the intensities of photosensors that are compensated photosensor measurement errors due to variable operating temperature in the HMD unit and the estimated gaze position. The processor 34 may also be programmed to estimating inter-pupilar distance measurements based on the determined gaze position of the patient eye. In some embodiments, as shown in FIG. 8, the processor 34 if programmed to operate the eye tracking system 18 including a first group 44 of photosensor 28 (e.g., Illumination setup A) and a second group 46 of photosensors 28 (e.g., Illumination setup B) that is orientated at different positions about the perimeter of the patient eye than the first group of photosensors 28. For example, in some embodiments the first and second groups of photosensors 28 include every other photosensor 28 such the groups of photosensors 28 are arranged in an alternating arrangement about the perimeter of the patient's eye 32. In other embodiments, the first group of photosensors 28 may be orientated on one side of the patient's eye 32 with the second group of photosensors 28 oriented on the opposite side of the patient's eye 32. Similarly, the eye tracking system 18 may include a plurality of light emitters 26 arranged in a first group 48 of light emitters 26 corresponding with the first group of photosensors 28, and a second group 50 of light emitters 26 corresponding with the second group of photosensors 28.

In some embodiments, the processor 34 is programmed to alternate illumination between the first and second group of light emitters 26 and acquire data from the first and second groups of photosensors 28 using analog-to-digital converters with additional operational amplifiers. The processor 34 is programmed to communicate with analog-to-digital converters and alternating switching between groups of light emitters 26. The processor 34 then calculates the eye position using a set of polynomial equations that map the photosensors 28 readings into eye position.

In the illustrated embodiment, the processor 34 is also programmed to execute the algorithm including the steps of adjusting display properties of the HMD unit based on the determined gaze position of the patient eye, and adjusting a rendering process for the HMD unit based on the determined gaze position of the patient eye. For example, the processor 34 may be programmed to operate the HMD unit 10 using foveated rendering to display high quality rendering of images of the virtual environment on the HMD unit 10 in accordance to the gaze direction estimated by the processor 34.

The processor 34 may also be programmed to execute the algorithm including the steps of receiving an interior temperature measurement of the UN/ID unit from the temperature sensor, and compensating photosensor measurement error based on the received interior temperature measurement of the HMD unit. The processor 34 may also be programmed to execute the algorithm including the steps of compensating photosensor measurement error by calculating a heat transfer formula between an interior of the HMD unit and photosensors to estimate a temperature of photosensors, wherein the heat transfer formula includes a coefficient determined based on the HMD unit. In some embodiments, the processor 34 executes the processing module 38 to compensate a non-linear independence of photosensor reading with a temperature of a photosensor.

The processor 34 may also be programmed to execute the algorithm including the steps of compensating photosensor measurement error connected with a temperature variation in the HMD unit. The processor 34 is also programmed to execute the algorithm including the steps of performing the calibration procedure including acquiring calibration data by operating the HMD unit to present a fixation target sequentially at multiple known locations, and detecting and storing light intensities gathered by the photosensors during presentation of the fixation target. The processor 34 may also be programmed to execute the algorithm including the steps of constructing the mapping between intensities values and a gaze position by using the calibration data to construct a mapping basing purely on a reading of a single user, or a general mapping modified for a selected user.

A controller, computing device, server or computer, such as described herein, includes at least one or more processors or processing units and a system memory (see above). The controller typically also includes at least some form of computer readable media. By way of example and not limitation, computer readable media may include computer storage media and communication media. Computer storage media may include volatile and nonvolatile, removable and non-removable media implemented in any method or technology that enables storage of information, such as computer readable instructions, data structures, program modules, or other data. Communication media typically embody computer readable instructions, data structures, program modules, or other data in a modulated data signal such as a carrier wave or other transport mechanism and include any information delivery media. Those skilled in the art should be familiar with the modulated data signal, which has one or more of its characteristics set or changed in such a manner as to encode information in the signal. Combinations of any of the above are also included within the scope of computer readable media.

The order of execution or performance of the operations in the embodiments of the invention illustrated and described herein is not essential, unless otherwise specified. That is, the operations described herein may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

In some embodiments, a processor, as described herein, includes any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term processor.

The device and methods of the present invention are not limited to the specific embodiments described herein and/or described in but rather, components of the device and/or steps of the method may be utilized independently and separately from other components and/or steps described herein. For example, the eye tracking systems may also be used in combination with other systems and methods, and is not limited to practice with only the HMD units as described herein. Rather, an exemplary embodiment can be implemented and utilized in connection with many other visual display applications.

The above description of illustrated examples of the present invention are not intended to be exhaustive or to be limitation to the precise forms disclosed. While specific embodiments of, and examples for, the invention are described herein for illustrative purposes, various equivalent modifications are possible without departing from the broader spirit and scope of the present invention.

What is claimed is:

1. An eye tracking system for use with a head-mounted display (HMD) unit, comprising:
   a support frame mounted to the HMD unit;
   a light source mounted to the support frame and configured to illuminate an area of a subject's eye;
   a plurality of photosensors mounted to the support frame and configured to receive reflected light from different portions of the illuminated eye;
   a temperature sensor mounted to the support frame and configured to measure an interior temperature of the HMD unit; and
   a processor programmed to execute an algorithm including:
   a processing module that compensates photosensor measurement error due to variable operating temperature in the HMD unit including:
   receiving the interior temperature measurement of the HMD unit from the temperature sensor;
   determining an estimated temperature of the photosensors based on the received interior temperature measurement of the HMD unit and a coefficient based on the HMD unit; and
   compensating photosensor measurement error based on the estimated temperature of the photosensors by calculating a heat transfer formula including:

$$T_{ph}(i)=T_{ph}(i-i)+K\cdot(T(i-1)-T(i));$$

wherein Tph(i) is an estimated photosensor temperature, T(i) is a measured interior temperature of the HMD unit, and K is a heat transfer coefficient; and
   an eye-tracking module that determines a gaze position of the eye using a mapping between intensities of photosensors and a gaze position estimated during a calibration procedure.

2. The eye tracking system of claim 1, wherein the processor is programmed to execute the algorithm including the steps of:
   determining the gaze position of the eye using the mapping between the intensities of photosensors that are compensated photosensor measurement errors due to variable operating temperature in the HMD unit and the estimated gaze position.

3. The eye tracking system of claim 1, wherein the processor is programmed to execute the algorithm including the steps of:
   adjusting display properties of the HMD unit based on the determined gaze position of the eye; and
   adjusting a rendering process for the HMD unit based on the determined gaze position of the eye.

4. The eye tracking system of claim 1, wherein the processor is programmed to execute the algorithm including the steps of:
   estimating inter-pupilar distance measurements based on the determined gaze position of the eye.

5. The eye tracking system of claim 1,
   wherein the heat transfer formula includes the coefficient based on the HIVID unit.

6. The eye tracking system of claim 1, wherein the processing module compensates a non-linear independence of photosensor reading with a temperature of a photosensor.

7. The eye tracking system of claim 1, wherein the processor is programmed to execute the algorithm including the steps of:
   compensating photosensor measurement error connected with a temperature variation in the HMD unit.

8. The eye tracking system of claim 1, wherein the processor is programmed to execute the algorithm including the steps of:
   performing the calibration procedure including acquiring calibration data by:
   operating the HMD unit to present a fixation target sequentially at multiple known locations; and
   detecting and storing light intensities gathered by the photosensors during presentation of the fixation target.

9. The eye tracking system of claim 1, wherein the processor is programmed to execute the algorithm including the steps of:
   constructing the mapping between intensities values and a gaze position by using the calibration data to construct a mapping basing purely on a reading of a single user, or a general mapping modified for a selected user.

10. A method of operating an eye tracking system mounted to an HMD unit, the eye tracking system including a light source configured to illuminate an area of a subject's eye, a plurality of photosensors configured to receive reflected light from different portions of the illuminated eye, a temperature sensor configured to measure an interior temperature of the HMD unit, and a processor, the method including the processor performing an algorithm including:
    a processing module that compensates photosensor measurement error due to variable operating temperature in the HMD unit including:
    receiving an interior temperature measurement of the HMD unit from the temperature sensor; and
    determining an estimated temperature of the photosensors based on the received interior temperature measurement of the HMD unit and a coefficient based on the HMD unit; and
    compensating photosensor measurement error based on the estimated temperature of the photosensors by calculating a heat transfer formula including:

$$T_{ph}(i)=T_{ph}(i-i)+K\cdot(T(i-1)-T(i))$$

wherein Tph(i) is an estimated photosensor temperature, T(i) is a measured interior temperature of the HMD unit, and K is a heat transfer coefficient; and an eye-tracking module that determines a gaze position of the eye using a mapping between intensities of photosensors and a gaze position estimated during a calibration procedure.

11. The method of claim 10, including the processor performing the algorithm including the steps of:
determining the gaze position of the eye using the mapping between the intensities of photosensors that are compensated photosensor measurement errors due to variable operating temperature in the HMD unit and the estimated gaze position.

12. The method of claim 10, including the processor performing the algorithm including the steps of:
adjusting display properties of the HMD unit based on the determined gaze position of the eye; and
adjusting a rendering process for the HMD unit based on the determined gaze position of the eye.

13. The method of claim 10, including the processor performing the algorithm including the steps of:
estimating inter-pupilar distance measurements based on the determined gaze position of the eye.

14. The method of claim 10, wherein the heat transfer formula includes the coefficient based on the HMD unit.

15. The method of claim 10, wherein the processing module compensates a non-linear independence of photosensor reading with a temperature of a photosensor.

16. The method of claim 10, including the processor performing the algorithm including the steps of:
compensating photosensor measurement error connected with a temperature variation in the HMD unit.

17. The method of claim 10, including the processor performing the algorithm including the steps of:
performing the calibration procedure including acquiring calibration data by:
operating the HMD unit to present a fixation target sequentially at multiple known locations; and
detecting and storing light intensities gathered by the photosensors during presentation of the fixation target.

18. A non-transitory computer-readable storage media having computer-executable instructions embodied thereon for operating an eye tracking system mounted to an HMD unit, the eye tracking system including a light source configured to illuminate an area of a subject's eye, a plurality of photosensors configured to receive reflected light from different portions of the illuminated eye, a temperature sensor configured to measure an interior temperature of the HMD unit, and a processor, when executed by the processor the computer-executable instructions cause the processor to perform an algorithm including:
a processing module that compensates photosensor measurement error due to variable operating temperature in the HMD unit including:
receiving an interior temperature measurement of the HMD unit from the temperature sensor; and
determining an estimated temperature of the photosensors based on the received interior temperature measurement of the HMD unit and a coefficient based on the HMD unit; and
compensating photosensor measurement error based on the estimated temperature of the photosensors by calculating a heat transfer formula including:

$$T_{ph}(i)=T_{ph}(i-i)+K\cdot(T(i-1)-T(i))$$

wherein Tph(i) is an estimated photosensor temperature, T(i) is a measured interior temperature of the HMD unit, and K is a heat transfer coefficient; and
an eye-tracking module that determines a gaze position of the eye using a mapping between intensities of photosensors and a gaze position estimated during a calibration procedure.

* * * * *